United States Patent
Glickman et al.

(10) Patent No.: US 9,330,024 B1
(45) Date of Patent: May 3, 2016

(54) PROCESSING DEVICE AND METHOD THEREOF

(71) Applicants: Eran Glickman, Rishon le Zion (IL); Nir Atzmon, Netanya (IL); Ron-Michael Bar, Ramat-Hasharon (IL); Benny Michalovich, Raanana (IL)

(72) Inventors: Eran Glickman, Rishon le Zion (IL); Nir Atzmon, Netanya (IL); Ron-Michael Bar, Ramat-Hasharon (IL); Benny Michalovich, Raanana (IL)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 57 days.

(21) Appl. No.: 14/510,493

(22) Filed: Oct. 9, 2014

(51) Int. Cl.
*G06F 12/10* (2006.01)

(52) U.S. Cl.
CPC .... *G06F 12/1081* (2013.01); *G06F 2212/1016* (2013.01); *G06F 2212/1041* (2013.01); *G06F 2212/152* (2013.01); *G06F 2212/608* (2013.01); *G06F 2212/65* (2013.01)

(58) Field of Classification Search
None
See application file for complete search history.

(56) References Cited

U.S. PATENT DOCUMENTS

| | | |
|---|---|---|
| 2007/0121499 A1 | 5/2007 | Pal et al. |
| 2009/0313438 A1 | 12/2009 | Krishnaprasad et al. |
| 2010/0161909 A1 | 6/2010 | Nation et al. |

*Primary Examiner* — Kevin Verbrugge (57) ABSTRACT

A processing device comprises inter alia a monolithic memory accumulator unit, which exposes a virtual memory space to an interconnect bus and comprises a conversion table with translation information to translate requests with virtual addresses into requests with physical addresses. The MMA is configured to receive a transaction request; to translate the address of the received request into physical address(es); and to pass on transaction request(s) to storage locations of an integrated peripheral.

A processing device comprises at least one integrated peripheral, IP, with an accessibility adapter unit, AA, which exposes a virtual memory space to the interconnect bus 650 and which comprises a conversion table with translation information. The AA 150 is configured to receive a transaction request; to translate the address of the received request into physical address(es); and to route transaction request(s) to storage locations of the IP.

19 Claims, 4 Drawing Sheets

PROCESSING DEVICE AND METHOD THEREOF

FIELD OF THE INVENTION

This invention relates to a processing device and to a method of operating the processing device. In particular, the present application relates to a processing device, and a method of operating thereof, with a configurable monolithic memory allowing for random access in the absence of or in addition to random access memory for storing data and instructions. More particularly, the storage capacity of the configurable monolithic memory is provided by storage resources implemented in peripherals operably coupled to the processing device.

BACKGROUND OF THE INVENTION

Processing platforms such a microprocessor units, MPUs, microcontroller units, MCUs, and system-on-chips, SoCs, require random access memory for operating. In various operation stages, the random access memory used for storing data and instructions during normal operation of the processing platform is not available. Such operation stages include for instance production and functional testing, device initialization, safe mode operation and the like. Thus, sophisticated algorithms requiring random access memory may not be executable during those exemplary operation stages of the platform. Another option is for the random access memory to be too small for certain user applications and enhancements limiting the longevity of the processing platform.

For allowing complex algorithm to be processed during the initialization stage of a processing platform, Cache-as-RAM, CAR, techniques have been developed. The Cache-as-RAM or No-Eviction Mode (NEM) enables the use of e.g. a second level, L2, cache as random access memory. Cache-as-RAM is for instance applied during memory initialization stage of a processing platform initialization. In particular, the memory initialization stage of complex processing platforms such as system-on-chips can be a time consuming process. Using Cache-as-RAM techniques allows implementing sophisticated boot algorithms, which are already carried out before and during the memory initialization stage. However, Cache-as-RAM requires complex modifications on the logical level of the processing platforms, not applicable when there is a need for the L2 cache or when there is no L2 cache at all.

The present application provides a processing device enabled for use of idle storage capacity.

SUMMARY OF THE INVENTION

The present invention provides a processing device and a method of operating thereof as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

In the drawings.

DETAILED DESCRIPTION OF THE PREFERRED EMBODIMENTS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

It is understood that the following disclosure provides many different embodiments, or examples, capable of implementing different features. Specific examples of components and arrangements are described below to simplify and thus clarify the present disclosure. These are, of course, merely examples and are not intended to be limiting. In many instances, the features of one embodiment may be combined with the features of other embodiments. In addition, the present disclosure may repeat reference numerals and/or letters in the various exemplary embodiments. This repetition is for the purpose of simplicity and clarity and does not itself dictate a relationship between the various embodiments and/or configurations discussed.

Figure 1:
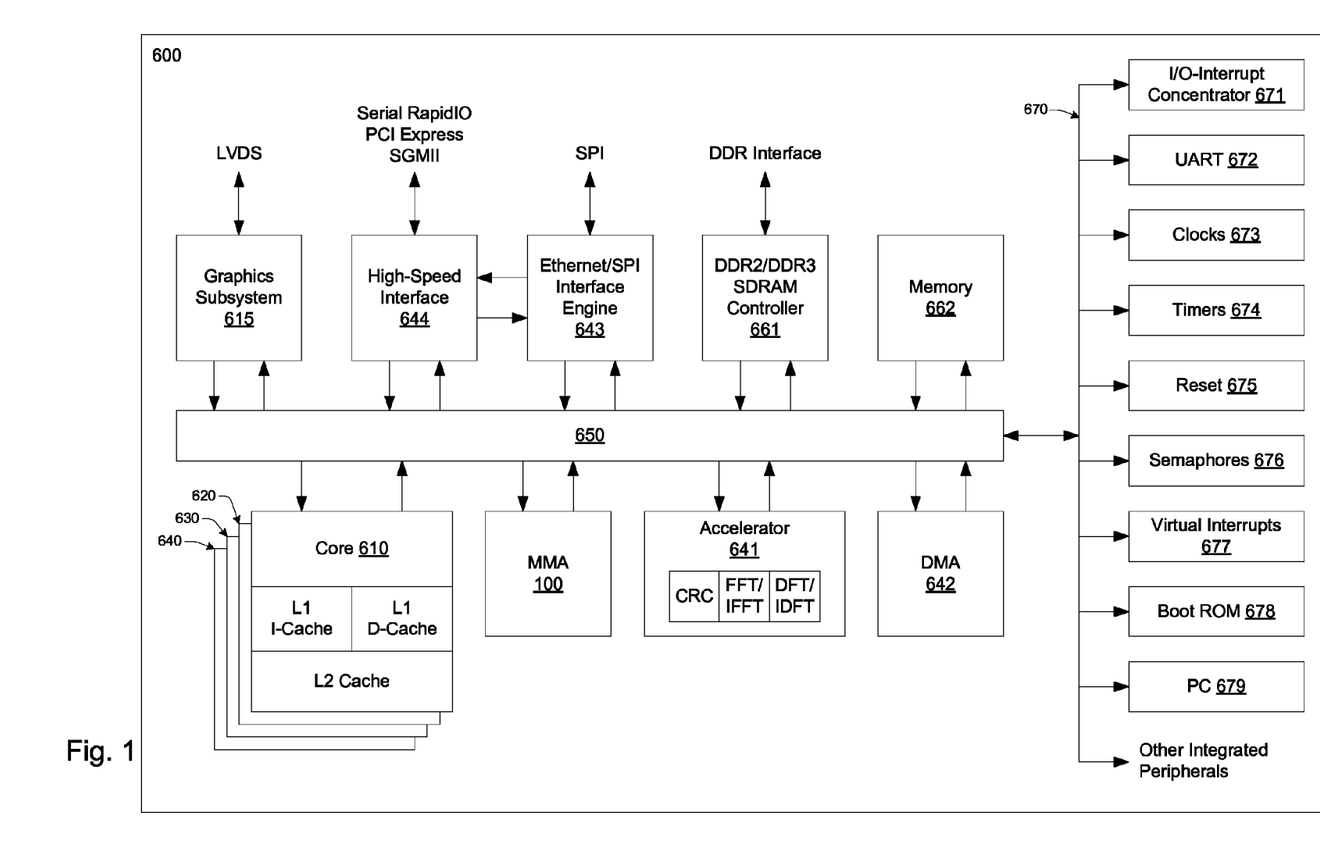
FIG. 1 schematically illustrates a block diagram of a system on chip (SoC) device that may be used to implement an example of the present invention.

Referring now to FIG. 1, there is shown a simplified schematic diagram of a multi-core system on chip 600 having multiple processor cores 610, 620, 630, and 640. As illustrated, each of the processor cores 610, 620, 630, 640 is coupled to one or more levels of cache memory, such as an L1 instruction cache (I-Cache), L1 data cache (D-Cache), and/or L2 cache. While the processor cores 610, 620, 630, 640 may be identically designed or homogenous, the multi-core SoC may also include one or more cores having a different design. For example, the depicted multi-core SoC 600 also includes an accelerator 641, which may include one or more processor cores for supporting hardware acceleration for DFT/iDFT and FFT/iFFT algorithms and for CRC processing. Each processor core is coupled across an interconnect bus 650 to one or more memory controllers 661, which are coupled in turn to one or more banks of system memory (not shown). The interconnect bus 250 also couples the processor cores to a Direct Memory Access (DMA) controller 642, network interface 643, a high speed serial interface 644, and to other hardware-implemented integrated peripherals 671 to 679. The interconnect bus 650 may be a coherency fabric.

Each of the processor cores 610, 620, 630, 640 may be configured to execute instructions and to process data according to a particular instruction set architecture (ISA), such as x86, PowerPC, SPARC, MIPS, and ARM, for example. Those of ordinary skill in the art also understand the present invention is not limited to any particular manufacturer's microprocessor design. The processor core may be found in many forms including, for example, any 32-bit or 64-bit microprocessor manufactured by Freescale, Motorola, Intel, AMD, Sun or IBM. However, any other suitable single or multiple microprocessors, microcontrollers, or microcomputers may be utilized. In the illustrated embodiment, each of the processor cores 610, 620, 630, 640 may be configured to operate independently of the others, such that all cores may execute in parallel. In some embodiments, each of cores may be configured to execute multiple threads concurrently, where a given thread may include a set of instructions that may execute independently of instructions from another thread. Such a core may also be referred to as a multithreaded (MT) core. Thus, a single multi-core SoC 600 with four cores will be capable of executing a multiple of four threads in this configuration. However, it should be appreciated that the invention is not limited to four processor cores and that more or fewer cores can be included. In addition, the term "core" refers to any combination of hardware, software, and firmware typically configured to provide a processing functionality with respect to information obtained from or provided to associated circuitry and/or modules (e.g., one or more peripherals, as described below). Such cores include, for example, digital signal processors (DSPs), central processing units (CPUs), microprocessors, and the like. These cores are often also referred to as masters, in that they often act as a bus master with respect to any associated peripherals. Furthermore, the term multi-core (or multi-master) refers to any combination of hardware, software, and firmware that that includes two or more such cores (e.g., cores 610 and 620), regardless of whether the individual cores are fabricated monolithically (i.e., on the same chip) or separately. Thus, a second core may be the same physical core as first core, but has multiple modes of operation (e.g., a core may be virtualized).

As depicted, each processor core (e.g., 610) may include a first level (L1) cache, which includes a data cache (D-Cache) and an instruction cache (I-Cache). In addition, a second level of cache memory (L2) may also be provided at each core, though the L2 cache memory can also be an external L2 cache memory, which is shared by one or more processor cores. The processor core 610 executes instructions and processes data under control of the operating system (OS) which may designate or select the processor core 610 as the control or master node for controlling the workload distribution amongst the processor cores 610, 620, 630, 640. Communication between the cores 610, 620, 630, 640 may be over the interconnect bus 650 or over a crossbar switch and appropriate dual point to point links according to, for example, a split-transaction bus protocol such as the HyperTransport (HT) protocol (not shown).

The processor cores 610, 620, 630, 640 and accelerator 641 are in communication with the interconnect bus 650 which manages data flow between the cores and the memory. The interconnect bus 650 may be configured to concurrently accommodate a large number of independent accesses that are processed on each clock cycle, and enables communication data requests from the processor cores 610, 620, 630, 640 to external system memory and/or an on-chip non-volatile memory 662, as well as data responses therefrom. In selected embodiments, the interconnect bus 650 may include logic (such as multiplexers or a switch fabric, for example) that allows any core to access any bank of memory, and that conversely allows data to be returned from any memory bank to any core. The interconnect bus 650 may also include logic to queue data requests and/or responses, such that requests and responses may not block other activity while waiting for service. Additionally, the interconnect bus 650 may be configured as a chip-level arbitration and switching system (CLASS) to arbitrate conflicts that may occur when multiple cores attempt to access a memory or vice versa.

The interconnect bus 650 is in communication with main memory controller 661 to provide access to the optional SOC internal memory 662 or main memory (not shown). Memory controller 661 may be configured to manage the transfer of data between the multi-core SoC 600 and system memory, for example. In some embodiments, multiple instances of memory controller 661 may be implemented, with each instance configured to control a respective bank of system memory. Memory controller 661 may be configured to interface to any suitable type of system memory, such as Double Data Rate or Double Data Rate 2 or Double Data Rate 3 Synchronous Dynamic Random Access Memory (DDR/DDR2/DDR3 SDRAM), or Rambus DRAM (RDRAM), for example. In some embodiments, memory controller 661 may be configured to support interfacing to multiple different types of system memory. In addition, the Direct Memory Access (DMA) controller 642 may be provided which controls the direct data transfers to and from system memory via memory controller 661.

The interconnect bus 650 is in communication with storage HUB 663 to provide access to mass storage (not shown). The storage HUB 663 may be configured to manage the transfer of data between the multi-core SoC 600 and mass storage units, for example. The storage HUB 663 may further include one or more interfaces specific for the technology used by the mass storage units. Herein, the storage HUB 663 is exemplarily illustrated to include a SD/eMMC Interface 664, which is provided to allow for access to SD (Secure Data), MMC (MultiMediaCard) cards (not shown) and/or eMMC (embedded MultiMediaCard) (not shown). Both storage technologies are implemented on the basis of non-volatile flash memory technology. In some embodiments, multiple instances of storage HUB 663 and/or interfaces provided with the storage HUB 663 may be implemented, with each instance configured to control a respective bank of system memory. Memory storage HUB 663 may be configured to interface to any suitable type of mass storage interfacing standards including in particular flash memory storage standards (SD, MMC), SAS (Serial Attached SCSI), SATA (Serial ATA) and the like.

The multi-core SoC 600 may comprise a dedicated graphics sub-system 200. The graphics sub-system 200 may be configured to manage the transfer of data between the multi-core SoC 600 and graphics sub-system 615, for example, through the interconnect bus 650. The graphics sub-system 615 may include one or more processor cores for supporting hardware accelerated graphics generation. The graphics generated by the graphics sub-system 615 may be outputted to one or more displays via any display interface such as LVDS, HDMI, DVI and the like.

As will be appreciated, the multi-core SoC 600 may be configured to receive data from sources other than system memory. To this end, a network interface engine 643 may be configured to provide a central interface for handling Ethernet and SPI interfaces, thus off-loading the tasks from the cores. In addition, a high-speed serial interface 644 may be configured to support one or more serial RapidIO ports, a PCI- Express Controller, and/or a serial Gigabit Media Independent Interface (SGMII). In addition, one or more interfaces may be provided which are configured to couple the cores to external boot and/or service devices, such as I/O interrupt concentrators 671, UART device(s) 672, clock(s) 673, timer(s) 674, reset 675, hardware semaphore(s) 676, virtual interrupt(s) 677, Boot ROM 678, I2C interface 679, GPIO ports, and/or other modules.

The integrated peripherals may be operably coupled to the interconnect bus 650 via one or more I/O bridges (not shown) and/or bus gaskets (not shown).

Figure 2:
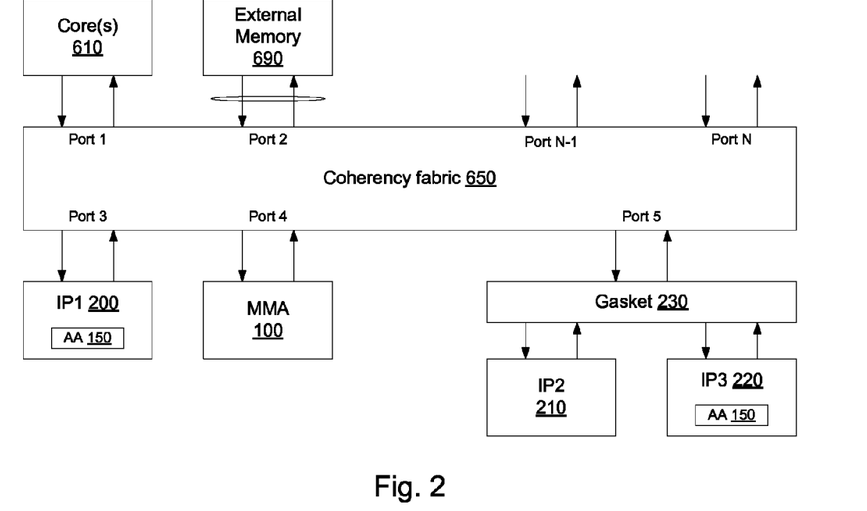
FIG. 2 schematically illustrates a block diagram of a SoC according to an example of the present invention.

With continued reference to FIG. 2, processing device or computing device 600 is schematically illustrated. The processing device or computing device of FIG. 2 is a processing device applicable in the context of the present application and generalized in view of the SoC exemplarily illustrated in FIG. 1. The computing device 600 includes a data transfer interconnect bus 650 that directly or indirectly couples the following devices: memory 690, one or more processor cores 610, one or more integrated peripherals 200, 210, 220, and a monolithic memory accumulator unit (MMA) 100. The interconnect bus 650 represents what may be one or more busses (such as an address bus, data bus, configuration bus, a host bus or any combination thereof). In particular, the interconnect bus comprises a coherency fabric or switching fabric establishing point-to-point interconnects between components connected thereto. The integrated peripherals 210, 220 may be operably coupled to the interconnect bus 650 via a I/O bridge (not shown) or a bus gasket 230.

The gasket 230 may be circuit, which implements transport level protocol support for communications over a resource interconnect. In one embodiment, gasket 230 of FIG. 2 implements a standard transport layer and translates to a transport layer supported by the one or more respective integrated peripherals operably coupled thereto.

Although the various blocks of FIG. 2 are shown with lines for the sake of clarity, in reality, delineating various components is not so clear, and metaphorically, the lines would more accurately be grey and fuzzy. Moreover, it should be noted that the components shown in FIG. 2 should not be understood as limiting. As described above, the processing device 600 may comprise further components. Further, the processing cores CPUs and the integrated peripherals may have memory. The diagram of FIG. 2 is merely illustrative of an exemplary processing device that can be used in connection with one or more embodiments of the invention.

Computing device 100 typically includes a variety of computer-storage media (not shown), in particular non-tangible transitory computer readable media 681 operatively (readably and/or writeably) coupled to the computing device 100 via one of the I/O interfaces 680 thereof. Computer-storage media may comprise Random Access Memory (RAM); Read Only Memory (ROM); Electronically Erasable Programmable Read Only Memory (EEPROM); flash memory; Compact Disk Read-Only Memory (CDROM), digital versatile disks (DVDs) or other optical or holographic media; magnetic cassettes, magnetic tape, magnetic disk storage or other magnetic storage devices.

The monolithic memory accumulator (MMA) 100 may be implemented as an integrated circuit, which exposes a virtual memory space to interconnect bus 650 for random access. In particular, the virtual memory space is exposed to the one or more processing cores 610 of the processing device 600. The exposed virtual memory space is in particular a monolithic memory space and more particularly a linear, monolithic memory space. The physical memory, which is addressable through the virtual memory space exposed by the MMA, is provided by one or more integrated peripherals 200 to 220.

Integrated peripherals have implemented storage resource required for operation thereof. The storage resources comprise without limiting thereto registers and register arrays, buffers (FIFOs: first-in-first-out buffers), memory arrays, and non-volatile memory (FLASH memory). The part of the storage resources may be memory or I/O mapped memory, the other part of the storage resources may be unmapped. Unmapped storage resources are not accessible through the interconnect bus 650. The storage resource of an integrated peripheral is required and used by it when being operated in accordance with its intended use. However, the storage resource of an integrated peripheral is idle or unexploited when the integrated peripheral is inactive or deactivated. The idle storage resources are made available by the MMA. In order to exploit the storage resources of an integrated peripheral, without negative impact on its functionality and operability, such integrated peripheral is configured to operate in at least two different operating modes. In an active or enabled operating mode, the integrated peripheral operates as intended. The storage resources of the "enabled" integrated peripheral, e.g., integrated peripheral in active/enabled operating mode, are required for and use in accordance with the intended purpose and hence cannot be made accessible for memory storage purpose. In storage operating mode, the integrated peripheral does not offer and serve its service of the intended purpose of usage. In this storage operating mode, the storage resources of the integrated peripheral is idle and can be used for a purpose other than the intended purpose of usage. The storage resources of an integrated peripheral in storage operating mode can be made available as a memory with random access for storing data and instructions. The memory resources of one or more disabled integrated peripherals may be managed by the MMA unit 100. For the sake of readability, the integrated peripheral operating in storage operating mode will be denoted as disabled integrated peripheral, which should be understood as further limiting.

The MMA 100 is configured to translate accesses to one or more locations of the virtual memory space to one or more memory locations of the memory resources of one or more integrated peripherals, the storage resources of which are made available for storing data and/or instructions. Therefore, the MMA 100 may translate the virtual addresses into physical addresses addressing a respective integrated peripheral and a memory location thereof, respectively.

Figure 3:
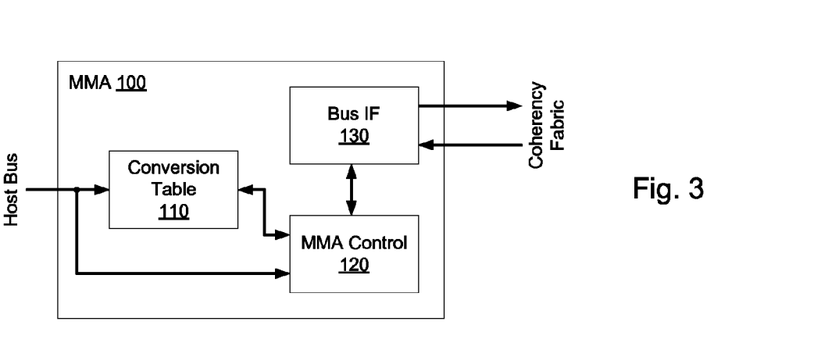
FIG. 3 schematically illustrates a block diagram of a monolithic memory accumulator unit according to an example of the present invention.

Referring further now to FIG. 3, the monolithic memory accumulator unit (MMA) 100, which may be implemented as an integrated circuit unit operably coupled to the interconnect bus 650 on which data is transferred, comprises a bus interface 130 for coupling to the interconnect bus 650, such as the coherency fabric of FIG. 2, a control unit 120 and a conversion table 110. The MMA 100 may be configurable. In particular, the table 110 and/or the control unit 120 are configurable. For configuration, the MMA 100 may comprise a further interface (not shown), which is provided to operably couple the MMA to a host bus of the processing device.

Figure 5:
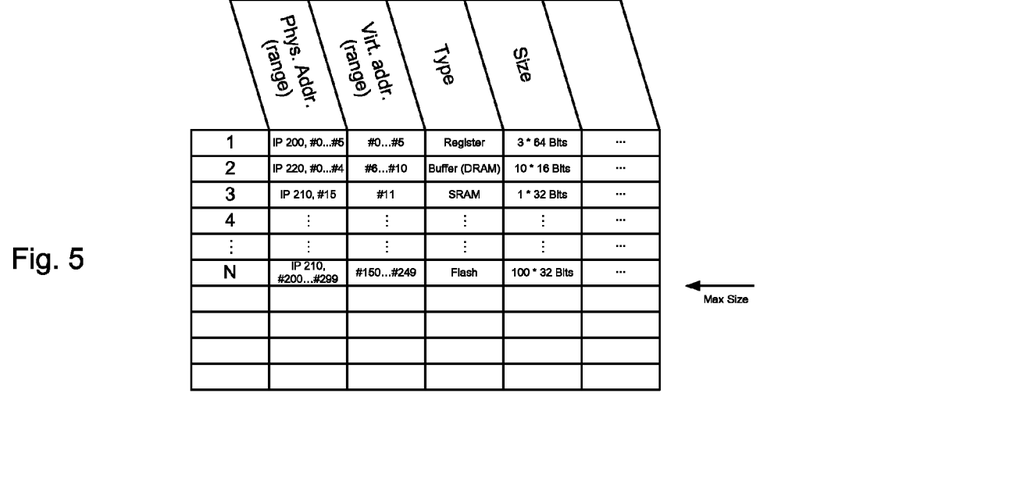
FIG. 5 show a schematic diagram of a conversion table according to an example of the present invention.

The conversion table 110 holds the information for translating addresses of a virtual address space into physical addresses, which address one or more storage locations of a physical storage arranged within one or more integrated peripherals. In particular, the conversion table 110 exposes a monolithic virtual memory space and manages the translation of accesses to virtual addresses into physical addresses of highly fragmented and separate physical storages. The conversion table 110 may further hold information about the size and the type of the physical storage. A schematic illustration of an exemplary conversion table is shown in FIG. 5. The type of storage may comprise information about the storage technology and/or storage organization. For instance the type of storage information may comprise register, buffer, Flash, dynamic RAM, static RAM and the like. The size of storage information may comprise an information about the bit width of the storage, the bit width of the bus through which the storage is accessible, and/or the number of individual storage elements. The information in the conversion table is used to translate between virtual and physical addresses and may be further used to split a data transaction request (read access or write access to a storage location or a range of storage locations) into one or more individual data transaction requests in dependence of for instance the size of the individual storages and the width of the one or more buses involved in the access to the one or more individual storages.

A data transaction request may be responded by the MMA 100 with an error message to the interconnect bus 650 indicating that for instance the requested size is not available.

The configuration table 110 may be implemented as a register array, which has a low access time allowing for fast translation between virtual memory addresses and physical addresses. The configuration table 110 may also be held in random access memory such as dynamic RAM. In this case, a prefetch buffer may be implemented, to buffer translation information of the conversion table, which are expected to be required in a subsequent data transaction request. The prefetch buffer may buffer the translation information of the one or more virtual addresses next to or at least close to a currently processed virtual address. The conversion table may further comprise an associative cache buffering translation information.

The conversion table 110 may be configurable for instance via a software application executed on one or more of the processing cores 610. The configurability of the conversion table 110 allows configuring the translation information held therein in accordance with the integrated peripherals, the storage resources of which are made available for storing data and/or instructions. Depending on the use case and the functionality required, different integrated peripherals are in storage operating mode, in which the storage resources thereof are usable.

Moreover, the configurability of the conversion table 110 allows to configure a virtual memory space in accordance with the use case for instance in that the required capacity of the virtual memory space is taken into consideration and the storage resources of only a selection of the integrated peripherals in storage operating mode are made available to access through the MMA 100 and the virtual-to-physical address translation thereof.

One or more sets of configuration data may be prepared. Each set of configuration data may be prepared for and adapted to one integrated peripheral. A prepared set of configuration data simplifies the configuration operation and reduces the risk of misconfiguration. The prepared set of configuration data may be stored in a storage of the MMA. The storage for the configuration data may be for instance a read only storage such as a once writable read only storage, which may be initialized during production, testing or configuration of a specific use case running on the device.

Figure 4:
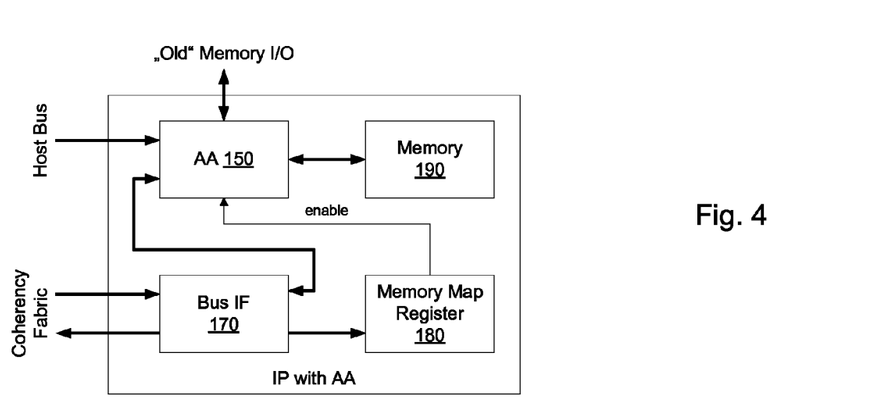
FIG. 4 schematically illustrates a block diagram of an integrated peripheral with an accessibility adapter unit according to an example of the present invention.

Referring further now to FIG. 4, an integrated peripheral in accordance with an example of the present invention comprises an accessibility adapter unit, AA, 150, which is arranged to process data transactions received from the interconnect bus 650 and perform transaction routing in the active/enabled operating mode and the storage operating mode. Accordingly, the AA 150 operates in accordance with the current operating mode of the integrated peripheral 200, 220.

In case the IP 200, 220 is operating in active/enabled operating mode, the AA 150 is configured to handle data transactions and route transactions in accordance with the intended purpose of use of the IP and the functionality thereof. The AA 150 is configured to enable the IP 200, 220 to provide the service in accordance with the intended purpose of use of the IP to the further components of the processing device 600.

In operating in active/enabled operating mode, the AA 150 is transparent and configured not to change or influence the original functionality of the IP 200, 220.

Figure 7:
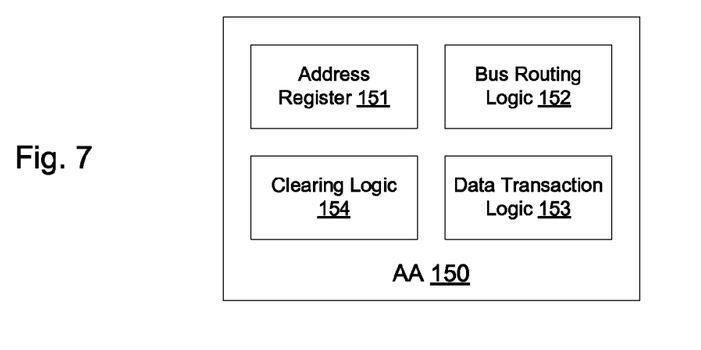
FIG. 7 schematically illustrates a block diagram of an accessibility adapter unit according to an example of the present invention.

In storage operating mode of the IP 200, 220, the AA 150 is configured to listen on the interconnect bus 650 for data transaction requests addressing storage locations of the storage resources provided for storage with random access. The AA 150 is configured to make accessible storage resources, which are unmapped and inaccessible when the IP 200, 220 operates in active/enabled operating mode. In order to enable access to the storage resources provided by the disabled IP 200, 220, the AA 150 may comprise an address register 151, which holds address and routing information associating addresses used in the transaction requests on the interconnect bus 650 and IP internal storage locations as further shown in FIG. 7 schematically illustrating a block diagram of an AA 150 and subcomponents thereof in accordance with an example of the present application. A data transaction logic 153 and bus routing logic 152 may be further provided, which access the information provided in the address register 151 for handling the data transaction requests received from the interconnect bus 650 via the bus interface 170 operably coupled thereto. The address register may comprise address and routing information for unmapped storage resources of the IP 200, 220. The address register may further comprise also address and routing information for unmapped storage resources of the IP 200, 220.

The AA 150 may be configurable. Configuration data may be received from a software application executed at least one of processing cores 610 of the processing device 600 via the host bus, to which the AA 150 is operably coupled. The AA 150 may be fixedly configured or the access to only a part of the storage resources is configurable. The other part of the storage resources may fixedly configured.

The AA 150 may further comprise a memory clearing logic 154, which is applicable to fill the storage locations of the storage resources with default content value(s). In particular, the memory clearing logic 154 allows for clearing the content of the storage locations of the storage resources. The memory clearing logic 154 may be triggered before making accessible the storage resources of the IP 200, 220 or before disabling access to the storage resources of the IP 200, 220. The memory clearing logic 154 ensures that for instance safety related data, confidential data, security related data and the like is not disclosed unintendedly.

The memory clearing logic 154 may be also configured to reset the IP 200, 220. For instance, a reset may be triggered when the operating mode of the IP 200, 220 transitions from the storage operating mode to the active/enabled operating mode in order to ensure proper functioning of the IP 200, 220 in active/enabled operating mode.

For the sake of completeness, it should be noted that the address translation/conversion functionality explained above with reference to the exemplary MMA 100 of FIG. 3 may be also implemented in the AA 150 of the IP 200, 220. The functionalities and operations of the MMA 100 and AA 150 will be further exemplified with reference to FIGS. 6 and 8 in the following supplementing the above description thereof.

Figure 6:
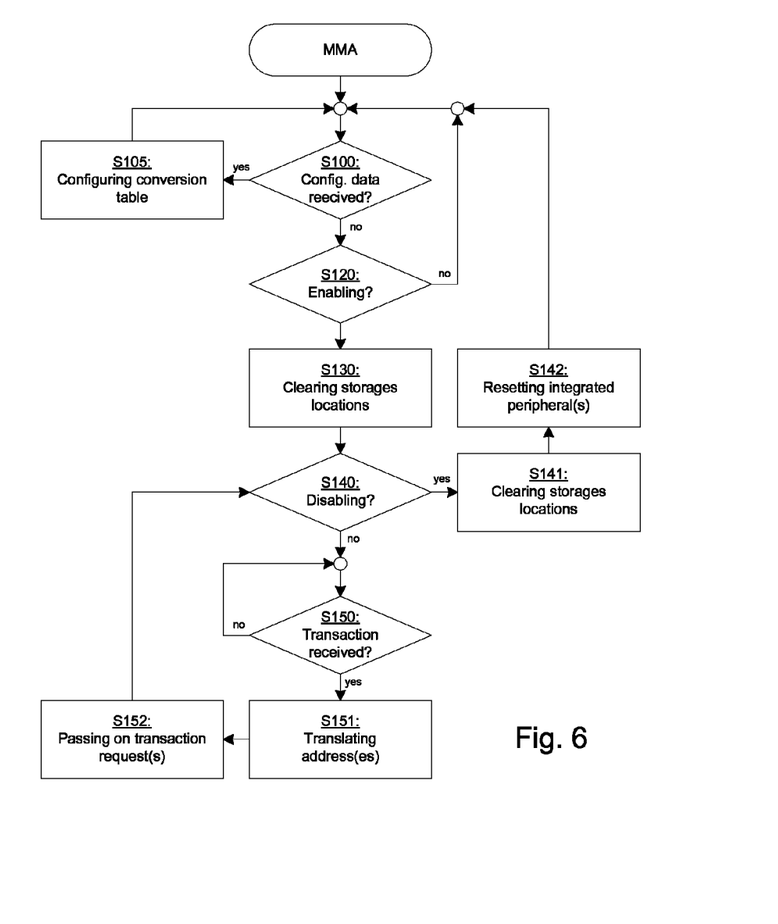
FIG. 6 schematically shows a flow diagram exemplifying an operation flow of a monolithic memory adapter unit according to an example of the present application.

Referring now to FIG. 6, the MMA 100 will be further explained with respect to a flow diagram exemplifying operations carried out by the MMA 100 according to an example of the present application.

Before enabling the functionality of the MMA 100, the conversion table and/or the control logic thereof may be configured. Upon receiving configuration data via the host bus, S100, the conversion table 110 and/or the control logic 120 is configured on the basis of the received configuration data, S105. The MMA 150 may be configurable at least as long the functionality of the MMA 100 is not enabled. The enabling of the functionality of the MMA 100 may be triggered by an enabling signal, S120, which is for instance received through the host bus used for configuration. The enabling signal may be issued by a software application running on at least one of the processing cores 610 of the processing device 600. However, the enabling signal may be also issued by another component such as an error handling component, interrupt handler and the like in response to a detected malfunction of the processing device 600, for instance. The MMA functionality may be enabled in response to detecting malfunction of random access memory operably coupled to the processing device 600.

After enabling of the MMA functionality, the storage resources configured for being made accessible may be cleared, S130. The MMA 100 may issue data transactions including default data content, e.g. zero values, for clearing the storage locations of the accessible storage resources. The MMA 100 may be further configured to issue signals to the IPs 200, 210, 220 providing storage resources to clear the respective storage resources.

Once the functionality of the MMA 100 is enabled, the MMA 100 may be disabled at any time. The disabling of the functionality of the MMA 100 may be triggered by a disabling signal, S130, which is for instance received through the host bus used for configuration. The disabling signal may be issued by a software application running on at least one of the processing cores 610 of the processing device 600. However, the disabling signal may be also issued by another component such as a reset control logic of the processing device 600, for instance.

In response to a disabling signal, the storage resources configured for being made accessible may be cleared, S141, and one or more of the IPs 200, 210, 220, which have been participating in making storage resources available, may be instructed to rest in order to ensure that the IPs return into a well-defined state.

During the functionality of the MMA 100 is enabled, the MMA 100 listen via the bus interface 130 on the interconnect bus 650 for data transaction requests, which address a virtual storage location within the virtual storage space exposed by the MMA 100. The MMA 100 listen for data transaction requests as long as the functionality of the MMA 100 is enabled, S150.

Once a data transaction request is detected to address a storage location of the exposed virtual storage space, the virtual address comprised in the data transaction request is extracted therefrom and translated to a physical address of the storage location of the storage resource of a respective IP 200, 210, 220, S151. The translation between virtual and physical address is performed on the basis of the translation information held in the conversion table 110 of the MMA 100. The received data transaction request may be split into one or more individual data transaction request, which comprises the physical addresses resulting from the translation operation and passed on to the respective one or more IPs 200, 210, 220, S152.

Figure 8:
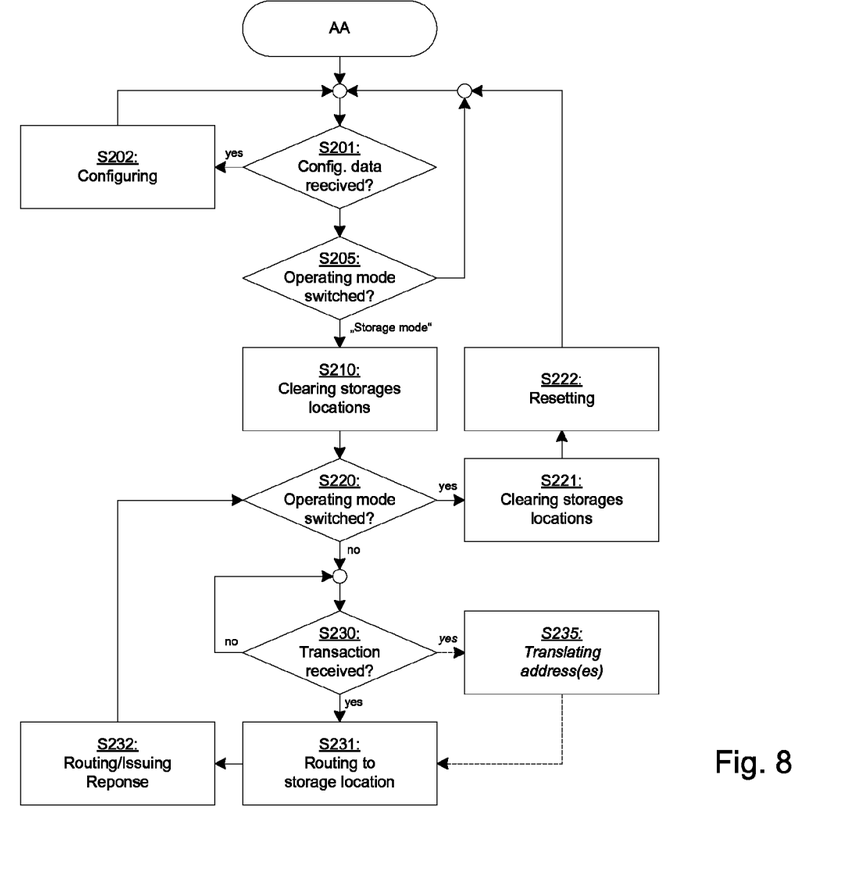
FIG. 8 schematically shows a flow diagram exemplifying an operation flow of an accessibility adapter unit according to an example of the present application.

Referring now to FIG. 8, the AA 150 will be further explained with respect to a flow diagram exemplifying the operations carried out by the MMA 100 according to an example of the present application.

Before enabling the storage operating mode of the IP 200, 220, the AA 150 and one or more components thereof may be configured.

Upon receiving configuration data via the host bus, S201, the AA 150 and/or one or more components thereof are configured on the basis of the received configuration data, S202. The AA 150 and components thereof may be configurable at least as long the IP 200, 220 is not in storage operating mode. The enabling of the functionality of the AA 150 may be triggered by the IP 200, 220 switching to the storage operating mode, S205, which is for instance received through the host bus used for configuration.

After the operating mode of the IP 200, 220 is transitioned to storage operating mode, the storage resources configured for being made accessible may be cleared, S210. The AA 150 may issue data transactions including default data content, e.g. zero values, for clearing the storage locations of the accessible storage resources. The AA 150 may be further configured to issue write transactions to storage locations to clear the respective storage resources. The storage locations of the IP 200, 220 may be cleared in response to a signal received from the MMA 100.

Once the functionality of the AA 100 is enabled in that the IP 200, 220 operates in storage operating mode, the AA 100 may be disabled at any time. The disabling of the functionality of the AA 100 may be triggered by a mode-transitioning signal, S220, which is for instance received through the host bus used for configuration. The mode-transitioning signal may be issued by a software application running on at least one of the processing cores 610 of the processing device 600. However, the mode-transitioning signal may be also issued by another component such as a reset control logic of the processing device 600, for instance.

In response to a mode transitioning signal or in response to operating mode of the IP transitioning to another operating mode, the storage resources configured for being made accessible may be cleared, S221, and the IP 200, 220 may be instructed to perform a rest in order to ensure that the IPs return into a well-defined state. The IP 200, 220 may be reset in response to a signal received from the MMA 100. The IP may operate in active/enabled operating mode in response to a reset thereof.

During the IP 200, 200 operates in storage operating mode and the AA 150 is enabled, the AA 100 listen via the bus interface 170 on the interconnect bus 650 for data transaction requests, which address a storage location managed by the AA 150, S230.

Once a data transaction request is detected to address a storage location of the storage resources of the IP made accessible by the AA 150, the AA 150 is configured to route the data transaction request to the respective storage location of the IP 200, 220, S231.

The bus routing logic 152 and the data transaction logic 153 may access the address register 151 of the AA 150 for detecting data transaction requests to be handled by the AA 150 and routing detected data transaction requests to the respective storage location of the IP 200, 220. The address register 151 is aimed to be used on memory regions that are not memory mapped and now are given a virtual mapping.

The AA 150 is further configured to route or issue one or more response transactions to the interconnect bus 650 in response to a detected data transaction request, which may be for instance a data read transaction request.

The AA 150 may further include a conversion table (now shown in FIGS. 4 and 7) and may be further provided for virtual to physical address translation. An AA 150 implementing address translation may expose an individual virtual storage space on the interconnect bus 650. The translation between virtual and physical address is performed on the basis of the translation information held in the conversion table of the AA 150. The conversion table may be part of the address register 151 of the AA 150. For address translation, the virtual address comprised in the data transaction request is extracted therefrom and translated to a physical address of the storage location of the storage resource of an IP 200, 220, S235. The translation between virtual and physical address is performed on the basis of the translation information held in the conversion table of the AA 150. The received data transaction request may be split into one or more individual data transaction request, which comprises the physical addresses resulting from the translation operation and routed to the respective storage location of the IP 200, 220, S231.

According to an example of the present application, a processing device comprises an interconnect bus 650 at least a processor 615, 610, 620, 630, 640 operatively coupled to the interconnect bus 650 at least one integrated peripheral, IP, 200, 210, 220 operatively coupled to the interconnect bus 650; and a monolithic memory accumulator unit, MMA, 100 operatively coupled to the interconnect bus 650.

The at least one IP 200, 210, 220 is operable in an storage operating mode, in which the IP 200, 210, 220 ceases to serve services in accordance with the intended purpose of use and in which storage resources 190 thereof are made accessible through the interconnect bus 650;

The MMA 100 exposes a virtual memory space to the interconnect bus 650 and comprises a conversion table 110 with translation information to translate transaction requests with virtual addresses into one or more transaction requests with physical addresses, The MMA 100 is further configured to receive a transaction request directed to a virtual address of the exposed virtual address space; to translate the virtual address of the received transaction request into one or more physical addresses; and to pass on one or more transaction requests each directed to one of the one or more storage locations of the at least one IP 200, 201, 220, which are identified by the one or more physical addresses.

According to an example of the present application, the MMA 100 is operably coupled to a host bus, and the MMA 100 is configured to receive configuration data via the host bus and to configure the conversion table in accordance with the received configuration data. According to an example of the present application, the IP 200, 210, 220 further comprises an accessibility adapter unit, AA, 150, which is configured to make accessible unmapped storage locations of the IP. According to an example of the present application, the MMA 100 is further configured to clear the storage resources associated with the exposed virtual memory space before first use and after last use. According to an example of the present application, the MMA 100 comprises at least one of a register array and a random access memory array, RAM, for storing the data of the conversion table 110. According to an example of the present application, the MMA 100 comprises a buffer storage for buffering one or more translation information in relationship with a currently processed virtual address. According to an example of the present application, the processing device is a system-on-chip 600.

According to an example of the present application, a processing device comprises an interconnect bus 650; at least a processor 615, 610, 620, 630, 640 operatively coupled to the interconnect bus 650; at least one integrated peripheral, IP, 200, 210, 220 operatively coupled to the interconnect bus 650.

The at least one IP 200, 210, 220 is operable in an storage operating mode, in which the IP 200, 210, 220 ceases to serve services in accordance with the intended purpose of use and in which storage resources 190 thereof are made accessible through the interconnect bus 650.

The IP 200, 220 comprises an accessibility adapter unit, AA, 150, which is configured to expose a virtual memory space to the interconnect bus 650 and which comprises a conversion table with translation information to translate transaction requests with virtual addresses into one or more transaction requests with physical addresses.

The AA 150 is further configured to receive a transaction request directed to a virtual address of the exposed virtual address space; to translate the virtual address of the received transaction request into one or more physical addresses; and to route one or more transaction requests each directed to one of the one or more storage locations of the storage resources of the IP 200, 220, which are identified by the one or more physical addresses.

According to an example of the present application, the AA 150 is further configured to make accessible unmapped storage locations of the IP. According to an example of the present application, the AA 150 is further configured to clear the storage resources of the IP when operating mode of the IP transitions to storage operating mode or to an operating mode different from the storage operating mode. According to an example of the present application, the AA 150 is further configured to rest at least a part of the components of the IP 200, 220 when operating mode of the IP transitions from the storage operating mode to an operating mode different from the storage operating mode. According to an example of the present application, the AA 150 is operably coupled to a host bus, and the AA 150 is configured to receive configuration data via the host bus and to configure in accordance with the received configuration data. According to an example of the present application, the AA 150 is configured to route a response transaction to the interconnect bus 650 in response to a detected data transaction request routed to the one of the one or more storage locations of the storage resources of the IP. According to an example of the present application, at least a part of the translation information to translate transaction requests with virtual addresses into one or more transaction requests with physical addresses is pre-configured in the conversion table of the IP.

Notably, the invention may be partially implemented in a computer program for running on a processing device, for example as explained above with reference to FIGS. 1 and 2. The processing device may comprise at least a processor operatively coupled to a memory for implementing the invention of the present application. The processing device may include at least code portions for performing of a method according to the invention when run on a programmable apparatus, such as a processing device or enabling a programmable apparatus to perform functions of a device component according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media are non-transitory, tangible computer-readable media. Such non-transitory, tangible computer-readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will be evident, however, that various modifications and changes may be made therein without departing from the broader spirit and scope of the invention as set forth in the appended claims.

Those skilled in the art will recognize that the boundaries between the illustrated logic blocks and/or functional elements are merely illustrative and that alternative embodiments may merge blocks or elements or impose an alternate decomposition of functionality upon various blocks or elements. Thus, it is to be understood that the architectures depicted herein are merely exemplary, and that in fact many other architectures can be implemented which achieve the same functionality.

Any arrangement of components to achieve the same functionality is effectively associated such that the desired functionality is achieved. Hence, any two components herein combined to achieve a particular functionality can be seen as associated with each other such that the desired functionality is achieved, irrespective of architectures or intermedial components. Likewise, any two components so associated can also be viewed as being operably connected, or operably coupled, to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be at least partly implemented as circuitry located on a single integrated circuit or within a same device. For example, one or more components of the MMA 100 of FIGS. 2 and 3 as well as one or more components of the AA 150 may be implemented on the basis of an integrated circuit. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as "computer systems".

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to distinguish arbitrarily between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A processing device, comprising:
an interconnect bus;
at least a processor operatively coupled to the interconnect bus;
at least one integrated peripheral, IP, operatively coupled to the interconnect bus; and
a monolithic memory accumulator unit, MMA, operatively coupled to the interconnect bus;
wherein the at least one IP is operable in an storage operating mode, in which the IP ceases to serve services in accordance with the intended purpose of use and in which storage resources thereof are made accessible through the interconnect bus;

wherein the MMA is configured to expose a virtual memory space to the interconnect bus and comprises a conversion table with translation information to translate transaction requests with virtual addresses into one or more transaction requests with physical addresses, wherein the MMA is further configured to receive a transaction request directed to a virtual address of the exposed virtual address space;

translate the virtual address of the received transaction request into one or more physical addresses; and pass on one or more transaction requests each directed to one of the one or more storage locations of the at least one IP, which are identified by the one or more physical addresses.

2. The processing device of claim 1,
wherein the MMA is operably coupled to a host bus, and
wherein the MMA is configured to receive configuration data via the host bus and to configure the conversion table in accordance with the received configuration data.

3. The processing device of claim 2,
wherein the IP further comprises an accessibility adapter unit, AA, which is configured to make accessible unmapped storage locations of the IP.

4. The processing device of claim 2,
wherein the MMA is further configured to clear the storage resources associated with the exposed virtual memory space before first use and after last use.

5. The processing device of claim 2,
wherein the MMA comprises at least one of a register array and a random access memory array, RAM, for storing the data of the conversion table.

6. The processing device of claim 1,
wherein the IP further comprises an accessibility adapter unit, AA, which is configured to make accessible unmapped storage locations of the IP.

7. The processing device of claim 6,
wherein the MMA comprises at least one of a register array and a random access memory array, RAM, for storing the data of the conversion table.

8. The processing device of claim 1,
wherein the MMA is further configured to clear the storage resources associated with the exposed virtual memory space before first use and after last use.

9. The processing device of claim 8,
wherein the MMA comprises at least one of a register array and a random access memory array, RAM, for storing the data of the conversion table.

10. The processing device of claim 1,
wherein the MMA comprises at least one of a register array and a random access memory array, RAM, for storing the data of the conversion table.

11. The processing device of claim 10,
wherein the MMA comprises a buffer storage for buffering one or more translation information in relationship with a currently processed virtual address.

12. The processing device of claim 1,
wherein the processing device is a system-on-chip.

13. A processing device, comprising:
an interconnect bus;
at least a processor operatively coupled to the interconnect bus;
at least one integrated peripheral, IP, operatively coupled to the interconnect bus; and
wherein the at least one IP is operable in an storage operating mode, in which the IP ceases to serve services in accordance with the intended purpose of use and in which storage resources thereof are made accessible through the interconnect bus;
wherein the IP comprises an accessibility adapter unit, AA, which is configured to expose a virtual memory space to the interconnect bus and which comprises a conversion table with translation information to translate transaction requests with virtual addresses into one or more transaction requests with physical addresses, wherein the AA is further configured to receive a transaction request directed to a virtual address of the exposed virtual address space;

translate the virtual address of the received transaction request into one or more physical addresses; and route one or more transaction requests each directed to one of the one or more storage locations of the storage resources of the IP, which are identified by the one or more physical addresses.

14. The processing device of claim 13,
wherein the AA is further configured to make accessible unmapped storage locations of the IP, wherein the storage resources of the IP to which transaction request are routable comprises mapped and/or unmapped storage areas.

15. The processing device of claim 13,
wherein the AA is further configured to clear the storage resources of the IP when operating mode of the IP transitions to storage operating mode or to an operating mode different from the storage operating mode.

16. The processing device of claim 13,
wherein the AA is further configured to rest at least a part of the components of the IP when operating mode of the IP transitions from the storage operating mode to an operating mode different from the storage operating mode.

17. The processing device of claim 13,
wherein the AA is operably coupled to a host bus, and
wherein the AA is configured to receive configuration data via the host bus and to configure in accordance with the received configuration data.

18. The processing device of claim 13,
wherein the AA is configured to route a response transaction to the interconnect bus in response to a detected data transaction request routed to the one of the one or more storage locations of the storage resources of the IP.

19. The processing device of claim 13,
wherein at least a part of the translation information to translate transaction requests with virtual addresses into one or more transaction requests with physical addresses is pre-configured in the conversion table of the IP.

* * * * *